Figure 1:
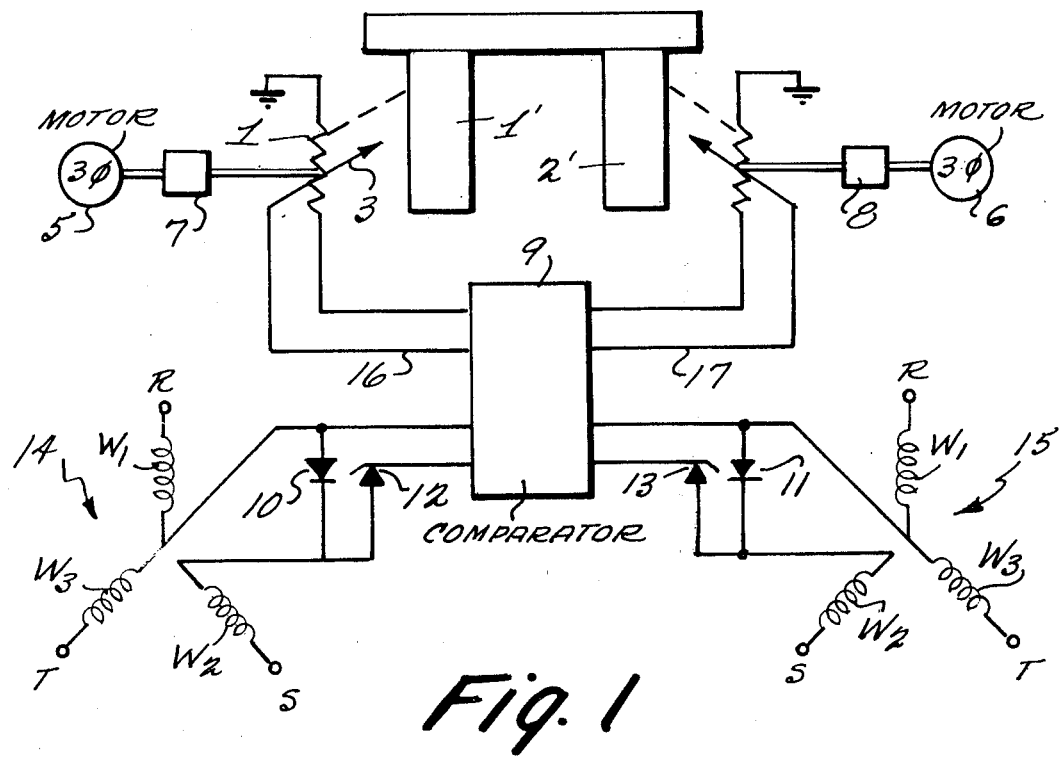

United States Patent [19]

Hegenbart

[11] 3,967,701
[45] July 6, 1976

[54] MULTI-COLUMN LIFTING APPARATUS AND SYNCHRONIZATION CONTROL DEVICE FOR SAME

[75] Inventor: Horst Hegenbart, Schwanheim, Germany

[73] Assignee: Gebr. Hofmann KG, Darmstadt, Germany

[22] Filed: Oct. 9, 1974

[21] Appl. No.: 513,512

[30] Foreign Application Priority Data
Oct. 29, 1973   Germany............................ 2354064

[52] U.S. Cl. ................................ 187/29 R; 318/73
[51] Int. Cl.² .......................................... B66B 1/30
[58] Field of Search ................. 187/29; 318/66, 68, 318/69, 70, 73, 80, 112, 466, 467

[56] References Cited
UNITED STATES PATENTS

| | | | |
|---|---|---|---|
| 2,443,657 | 6/1948 | King................................. | 318/73 X |
| 2,534,917 | 12/1950 | King................................. | 318/73 X |
| 2,737,619 | 3/1956 | Shank et al. ........................... | 318/73 |
| 3,789,280 | 1/1974 | Oldfield ............................ | 318/77 X |

Primary Examiner—Robert K. Schaefer
Assistant Examiner—W. E. Duncanson, Jr.
Attorney, Agent, or Firm—Cushman, Darby and Cushman

[57] ABSTRACT

A lifting apparatus of the type having a number of columns supporting a load platform each column driven by an electrical, polyphase current motor whereby sensors on each column, for example potentiometers, produce a signal indicating the height of that column. The signals are applied to a comparator which in turn provides an output to one or more electronic switches, such as a triac or thyristor having a diode connected in parallel with it for conducting current in an opposite direction, each such switch connected to a winding of a motor to control the current applied so as to reduce any difference in height among the columns.

12 Claims, 2 Drawing Figures

U.S. Patent   July 6, 1976   3,967,701

MULTI-COLUMN LIFTING APPARATUS AND SYNCHRONIZATION CONTROL DEVICE FOR SAME

This invention relates to a multi-column lifting apparatus and to a synchronisation control apparatus for such a lifting apparatus.

In previously proposed motor vehicle lifts which have two or more columns supporting a lifting platform, each column has a drive spindle for raising and lowering respective carriages which are vertically movable along the columns and which carry the platform. However, only one spindle is driven by a motor, and the other spindle or spindles are driven from the first spindle for example by a cable or chain transmission. This mode of actuation of the lifting apparatus makes it necessary to provide a transverse member between the two support columns, so that the chain or cable transmission can be accommodated in the transverse member.

The transverse member however can be a serious inconvenience when the lift is not being used, particularly if the space between the columns is to be used as a passage for vehicles or persons. In addition, bringing accessory equipment into position below a vehicle lifted on the lifting apparatus can also be greatly complicated by the presence of the transverse member. This can give rise to a substantial risk of accident.

Moreover, nowadays, there is an increasing requirement for lifting apparatus which are each specifically intended for one type of motor vehicle or for a given series of related vehicles, so that different widths of lifting platforms are desired. The lifting platform manufacturer should therefore have available lifting platforms in different widths, so that he can meet customers' orders quickly.

Due to the presence of the transverse member, however, the columns cannot be arranged differently relative to each other, even to a limited extent, if for example diagonal positioning or slight displacement of the columns is desired or appears advantageous.

In order to overcome the above-discussed disadvantages of such platform lifting apparatuses, in recent times there has been a trend to provide independently actuated lifting columns, each with a separate drive motor; the drive motors are controlled synchronously so that there is no need for cross connections between the columns, such as the above-mentioned chain transmissions or the like (see the journal "Kfz-Betrieb und Automarkt", Aug. 30, 1973, page 25).

Synchronisation of actuation of the lifting columns is naturally highly important as regards reliability and operational efficiency of the lifting apparatus. If there are variations in the rotary drive speed of the motors, even small variations can cause differences in movement as between the two or more columns to be added together so that, when the lifting platform is raised or lowered a number of times, the difference in height between the carriages supporting the platform becomes so great that safe lifting of a motor vehicle is no longer ensured, and the vehicle can even fall from the platform.

According to the present invention, there is provided a lifting apparatus comprising a plurality of columns, a respective carriage vertically movable along each column, means supported by the carriages for carrying a load to be lifted, a respective electrical polyphase current motor operable to move each said carriage, a sensing means operatively associated with each said column and operable to deliver an electrical signal depending on the height of lift of the respective carriage, comparing means connected to said sensing means for receiving and comparing these signals, and an electronic polyphase current switch controllable by the comparing means and actuated thereby, when there is a difference between the signals from the sensing means, to supply a reduced current to the respective one of the motors.

Figure 2:
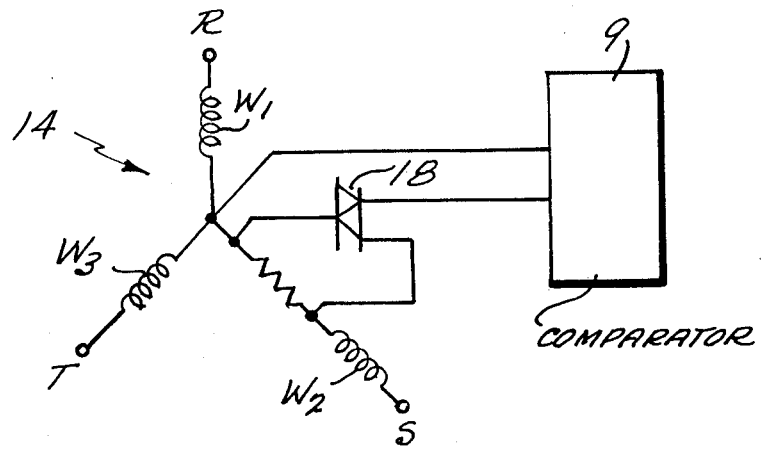

A lifting apparatus according to the present invention will now be described by way of example with reference to the accompanying drawing, in which:

FIG. 1 shows a diagrammatic view of a synchronisation control apparatus of the lifting apparatus, and FIG. 2 shows part of the apparatus of FIG. 1, using an alternating current triode switch (triac).

A lifting apparatus comprises two, or possibly more, columns, each of which carries a vertically movable carriage. The carriages support a load-carrier means for lifting a load such as a motor vehicle; the load-carrier means can be for example a single flat platform supported by all the carriages jointly.

In FIG. 1, potentiometers 1 and 2 are operatively associated with each of the two diagrammatically illustrated columns 1' and 2' of a two-column platform lift. Instead of the potentiometers 1 and 2, differential transformers or other comparable sensing control means can also be used. The sensing or operational length of the potentiometers 1 and 2 corresponds to the lifting height, that is, the vertical distance between the fully raised and the fully lowered position of the platform. Further sensing units 3 and 4 are controlled by way of drive means 5 and 6, in accordance with the height of lift of the carriage of the respective column to adjust the settings of the potentiometers. Transmission means 7 and 8 are provided between the units 3 and 4 and the potentiometers 1 and 2 respectively, so that full modulation of the potentiometers 1 and 2 corresponds to the full lift height of the lifting carriages with platform.

When the potentiometers 1 and 2 are supplied with current, the voltage tapped off at the potentiometers is passed by way of leads 16 and 17 to a conventional comparator circuit 9. Comparator 9 compares the two voltages, the comparison operation preferably being carried out by means of a mechanical threshold switch which has three switching positions. The output of the comparing means 9 is used to control the thyristors 12 and 13 in dependence on the result of the comparison between the voltages taken off at the potentiometers as will be described below.

A respective diode 10 and 11 and a respective thyristor 12 and 13 are connected in anti-parallel to each other, to the star point connection of one phase winding of electric motors 14 and 15 respectively, which are shown in the form of star-connected asynchronous polyphase motors. Such motors have been found particularly suitable for platform lifts. References R, S and T denote the AC supply connections of the motors, while references $W_1$, $W_2$ and $W_3$ denote the motor phase windings.

When the voltages taken off at the potentiometers 1 and 2 are equal, both thyristors 12 and 13 are caused to conduct so that the motors 14 and 15 are unaffected by the presence of the thyristors, and are supplied with normal polyphase current, one half-cycle of the alternating current being conducted by the switched-on thyristor and the other half-cycle being conducted by the diode in parallel thereto. When however the voltage for example at the potentiometer 2 is lower than that at the potentiometer 1, only the thyristor 13 is caused to conduct. The thyristor 12 is rendered non-conducting so that only one-half of the alternating supply current to the motor 14 is conducted, by way of the diode 10. This causes the torque of the asynchronous motor 14 to be reduced, so as to result in increased slip and a fall in the speed of motor rotation under load. It will be apparent that it is when there is a load to be lifted on the platform that synchronisation of the carriages is most important. This fall in speed causes the carriage (not shown) driven by the motor 14 to be lifted at a lower speed, until the two carriages are again at the same height, the voltage difference is again zero, and the two thyristors 12 and 13 are simultaneously switched into their conducting condition.

If the voltage difference as between the two potentiometers becomes excessive, for example due to interference or some other operational trouble, both the motors 14 and 15 are switched off, to prevent operation of the lifting platform.

FIG. 2 shows another circuit which illustrates by way of example, with reference to the motor 14, how an alternating current triode switch 18 (triac) can be connected in parallel to a resistor r, to control the motor 14. The triac 18 is switched on or off by the comparing means 9, depending on whether there is a voltage difference between the voltages supplied by the sensing means sensing the position of the respective carriages. In normal operation, that is to say, when there is no voltage difference, the triac 18 is in the conducting condition to conduct both half-cycles of the alternating current supply so that the resistor r is shunted and unreduced polyphase current is supplied to the motor 14. If however a voltage difference occurs, the triac 18 is rendered non-conducting by comparator 9 so that one phase of the polyphase motor is supplied with a reduced current, owing to the presence of the resistor r. This causes the torque of the asynchronous motor 14 to be reduced, and the speed of lift of the respective carriage to be decreased. As soon as the two carriages are again at the same height, the above-mentioned voltage difference becomes zero and the triac 18 is rendered conducting again, by the action of the comparing means 9.

If a thyristor with a diode connected in parallel thereto is used, such as in FIG. 1, this arrangement can be and preferably is provided only in one phase winding of the motor, for reasons of cost. If however the triac 18 in conjunction with the resistor r is used as in FIG. 2, such an arrangement can be provided in two or even in three phases of the motor. The resistor r can be an ohmic resistor or a reactance or blind resistor.

It will be seen from the foregoing that there is associated with each of the lifting columns a sensing means from which there can be continuously taken a voltage which corresponds to the height of lift of the lifting carriages and the platform. This voltage is passed to a comparing means which compares the voltages from the respective sensing means and, by reference to the result of the comparison operation, takes over control of the polyphase current motors for actuating the carriages. When the voltages delivered by the sensing means are different, the polyphase current motor which is leading, that is to say, the motor which is driving the higher of the two lifting carriages, is supplied with a reduced supply current, until the difference between the voltages at the sensing means is again zero.

An article by Wilhelm Koch, Siegburg, "Kontaktlose Drehstromschalter", from a special print from "Elektroanzeiger", No. 16, edition for the whole industry, dated July 30, 1969, discloses that polyphase current motors can be switched on and off by the switching on and off of electronic polyphase current switches, for example thyristors or alternating current triode switches or triacs. When using such electronic polyphase current switches, it is in fact possible to eliminate relays which have a relatively short working life when the switching frequency is high and which can suffer from the unacceptable phenomenon of relay chatter. In addition, it is possible to eliminate power amplifiers or electronic protective relays which must be provided when there is direct control by way of the relay, as the switching power of the sensitive control contacts is not sufficient for directly switching the relays or the load.

In the above-mentioned previously proposed mode of control of the polyphase current motors by means of electronic switches, this however is effected by continuously cutting the motors in and out, with the result that, due to the high starting currents, the motors also suffer a rise in temperature. In contrast, in the above-described lifting apparatus, when the lifting height signals representing the carriage heights (voltages at potentiometers 1 and 2) are of different strengths, the leading motor is fed with a reduced current, in that one half-cycle of the a-c supply voltage is applied to one phase winding of the motor.

As is disclosed in the above-mentioned article, the connection of the control circuit of the thyristor and diode or the triac 18 to the star point of each of the motors means that a separate protective means for the semiconductor elements can be eliminated, as the respective phase winding of the motor lies upstream of the circuit. In addition the circuit will operate with an extremely low interference voltage, as the thyristor 12, 13 is cut out as the current passes through zero.

With the above-described lifting apparatus therefore, it is not that the leading motor is wholly cut out, but rather that the leading motor is only supplied with a reduced current. This overcomes various disadvantages involved in switching the motor on and off, for example the excessively increased thermal loading on the motor and generation of oscillations in the motor speed, which should be avoided as far as possible, particularly when lifting a heavy load such as a motor vehicle.

Many changes and modifications in the above-described embodiments of the invention can of course be carried out without departing from the scope of the invention. Accordingly, that scope is intended to be limited only by the scope of the appended claims.

What we claim is:
1. A lifting apparatus comprising
   a plurality of columns, a respective carriage vertically movable along each column,
   means supported by the carriages for carrying a load to be lifted,
   a respective electrical polyphase current motor operable to move each said carriage,
   a sensing means operatively associated with each said column and operable to deliver an electrical signal depending on the height of lift of the respective carriage, comparing means connected to said sensing means for receiving and comparing said signals, and an electronic polyphase current switch controllable by the comparing means and actuated thereby, when there is a difference between the signals from the sensing means, to supply a reduced current to the respective one of said motors.

2. A lifting apparatus according to claim 1 wherein each said motor is an asynchronous motor.

3. A lifting apparatus according to claim 1 including means effective when there is a said difference between said signals, to apply only one half-cycle of the supply voltage to one or more of the phase windings of the respective motor.

4. A lifting apparatus according to claim 1, wherein each motor is connected in star configuration and each said electronic polyphase current switch is connected at the star point to one or more of the phase windings of the respective motor.

5. A lifting apparatus according to claim 1 wherein each said electronic polyphase current switch is in the form of an alternating current triode switch for short-circuiting a resistor connected into a phase winding of the respective motor.

6. A lifting apparatus according to claim 1 wherein each said electronic polyphase current switch is in the form of a thyristor with a diode connected in parallel thereto for conducting current in an opposite direction.

7. A lifting according to claim 1 wherein said sensing means of each column includes a potentiometer.

8. A lifting apparatus according to claim 1 wherein said comparing means is in the form of a mechanical threshold switch.

9. A lifting apparatus according to claim 1 wherein, when said difference between said signals exceeds a given level, the motors of all the columns are switched off.

10. A control circuit for a lifting apparatus having a plurality of movable columns and a motor associated with each said column for moving that column comprising:

sensing means coupled to each said column for producing an electrical signal which varies as a function of the height of that column, comparator means connected to said sensing means for receiving said signal and producing a control signal indicating differences in height between said columns and control means connected to said motors and said comparator means for varying the current applied to the motors and accordingly the speed of the motors to reduce differences in height between said columns, including a thyristor having its anode and cathode connected to a motor winding and its gate connected to said comparator means and a diode connected in parallel to said thyristor for conducting current in an opposite direction.

11. A control circuit as in claim 10 wherein said control means includes a triode.

12. A control circuit as in claim 10 wherein said sensing means each include a potentiometer.

* * * * *